United States Patent
Mityagin

(10) Patent No.: US 9,727,727 B2
(45) Date of Patent: Aug. 8, 2017

(54) SCANNING CONTENT ITEMS BASED ON USER ACTIVITY

(71) Applicant: Dropbox, Inc., San Francisco, CA (US)

(72) Inventor: Anton Mityagin, San Diego, CA (US)

(73) Assignee: DROPBOX INC., San Francisco, CA (US)

( * ) Notice: Subject to any disclaimer, the term of this patent is extended or adjusted under 35 U.S.C. 154(b) by 0 days.

(21) Appl. No.: 14/498,908

(22) Filed: Sep. 26, 2014

(65) Prior Publication Data

US 2016/0092683 A1 Mar. 31, 2016

(51) Int. Cl.
*G06F 21/56* (2013.01)
*H04L 29/06* (2006.01)

(52) U.S. Cl.
CPC ........ *G06F 21/561* (2013.01); *H04L 63/1433* (2013.01); *H04L 63/20* (2013.01)

(58) Field of Classification Search
CPC . H04L 63/1416; H04L 63/1433; H04L 63/20; G06F 21/561
USPC .......................................................... 726/24
See application file for complete search history.

(56) References Cited

U.S. PATENT DOCUMENTS

| | | | |
|---|---|---|---|
| 5,960,170 A | 9/1999 | Chen et al. | |
| 7,757,023 B1* | 7/2010 | Ranganathan | ...... G06F 13/4022 709/225 |
| 8,161,556 B2 | 4/2012 | Smith et al. | |
| 8,782,800 B2 | 7/2014 | Brennan et al. | |
| 8,918,867 B1* | 12/2014 | Salour | ................. G06F 21/6245 726/22 |
| 2012/0293303 A1* | 11/2012 | Khan | ...................... G06F 21/32 340/5.82 |
| 2014/0026182 A1* | 1/2014 | Pearl | ....................... G06F 21/60 726/1 |

\* cited by examiner

*Primary Examiner* — Kambiz Zand
*Assistant Examiner* — Aubrey Wyszynski
(74) *Attorney, Agent, or Firm* — DLA Piper LLP (US)

(57) ABSTRACT

In some embodiments, a content management system can initiate a scan of a content item when the content management system detects that activity associated with the content item triggers a scan policy. In some embodiments, a content management system can initiate a scan of a user's account when the content management system detects that activity associated with the content item triggers a scan policy. A scan policy can specify, for example, a number of shares, downloads and/or previews of the content item allowable in a period of time. When the number of shares, downloads, and/or previews exceeds the specified number in the policy in the specified period of time, the content management system can initiate a scan (e.g., virus scan, malware scan, etc.) of the content item and/or the user's account.

12 Claims, 6 Drawing Sheets

SCANNING CONTENT ITEMS BASED ON USER ACTIVITY

TECHNICAL FIELD

The disclosure generally relates to anti-malware and antivirus systems.

BACKGROUND

A network-based content management service can store an enormous quantity of data (content items) for many thousands of users. Typically, a content management service allows users to upload, store and retrieve content items to and from the network servers managed by the content management service. Additionally, the content management service can provide functionality that allows one user to share content items hosted by the content management service with other users of the service. This content sharing feature can allow a malicious user to share or distribute malicious content to other users of the content management service.

To combat the spread of malicious content, a content management service could run a virus scan on each content item uploaded to, stored to or shared from the storage servers of the service. However, with terabytes, petabytes and even exabytes of data stored, it is not practical for the content management service to run a virus scan on each content item stored at the content management service. Thus, a mechanism is needed by which the content management service can detect and prevent the spread of malware (e.g., viruses) while not being burdened with scanning every content item stored by the content management service.

SUMMARY

In some embodiments, a content management system can initiate a scan of a content item when the content management system detects that activity associated with the content item triggers a scan policy. In some embodiments, a content management system can initiate a scan of a user's account when the content management system detects that activity associated with the content item triggers a scan policy. A scan policy can specify, for example, a number of shares, downloads and/or previews of the content item allowable in a period of time. When the number of shares, downloads, and/or previews exceeds the specified number in the policy in the specified period of time, the content management system can initiate a scan (e.g., virus scan, malware scan, etc.) of the content item and/or the user's account.

Particular embodiments provide at least the following advantages: a content management system can detect malware without scanning every content items stored at the content management system; malware detection can be performed using fewer computing resources and less time; and the content management system can focus its malware detection processes on content items that are associated with high-risk activities.

Details of one or more embodiments are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

System Overview

Various embodiments of the disclosure are discussed in detail below. While specific embodiments are discussed, it should be understood that this is done for illustration purposes only. A person skilled in the relevant art will recognize that other components and configurations may be used without parting from the spirit and scope of the disclosure.

The disclosed technology addresses the need in the art for detecting malicious content in a content management system without scanning every content item stored by, shared through, or uploaded to the content management system. In some embodiments, a the content management system can select content items to scan with anti-malware or anti-virus software based on how frequently the content items are shared, previewed or downloaded.

Figure 1:
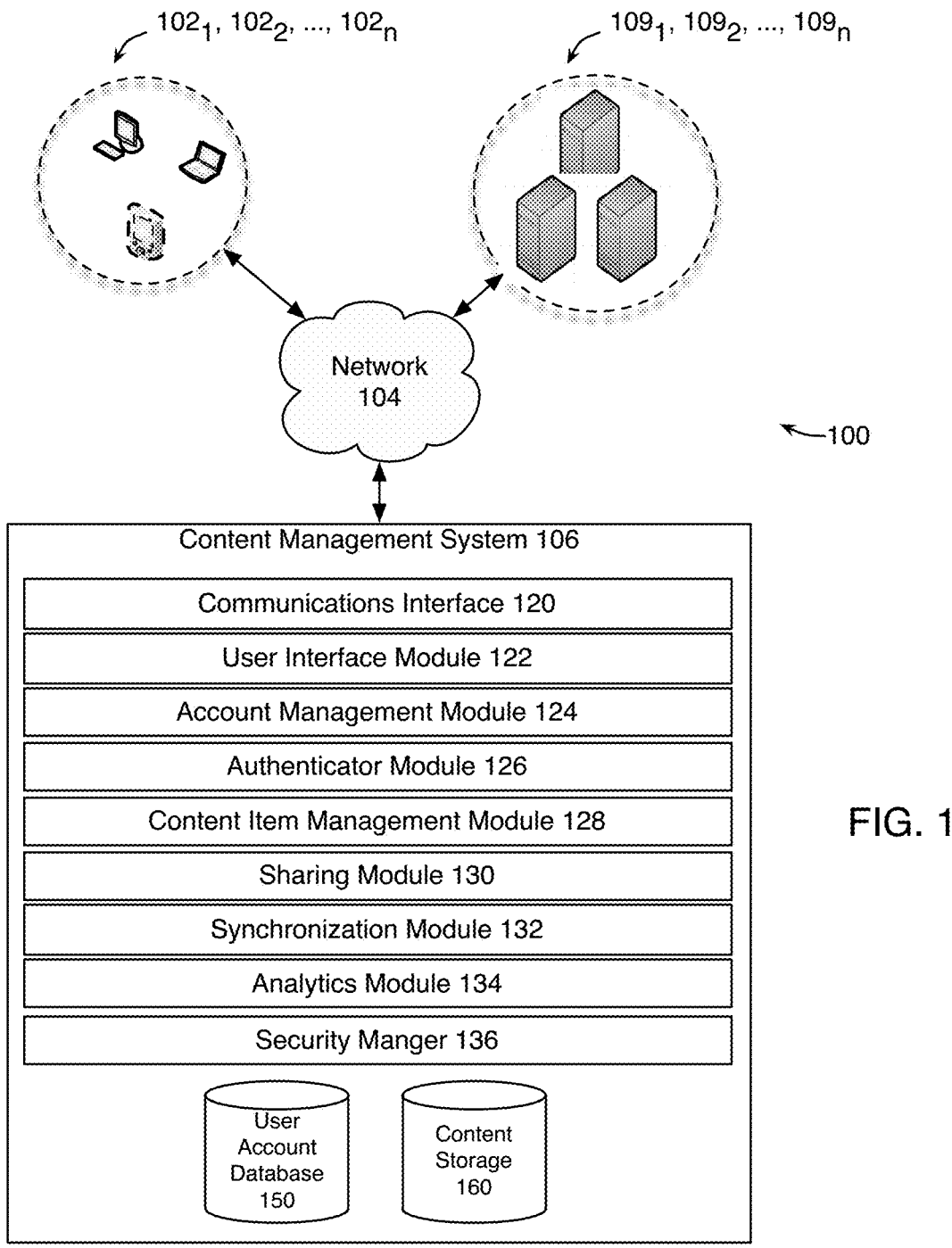
FIG. 1 illustrates an example content management system.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, . . . , $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1$, $109_2$, ..., $109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

In some embodiments, content management system 106 can include security manager 136. For example, security manager 136 can be configured to scan content items based on user activity as described in detail below.

While content management system 106 is presented with specific components, it should be understood by one skilled in the art, that the architectural configuration of system 106 is simply one possible configuration and that other configurations with more or less components are also possible.

Figure 2:
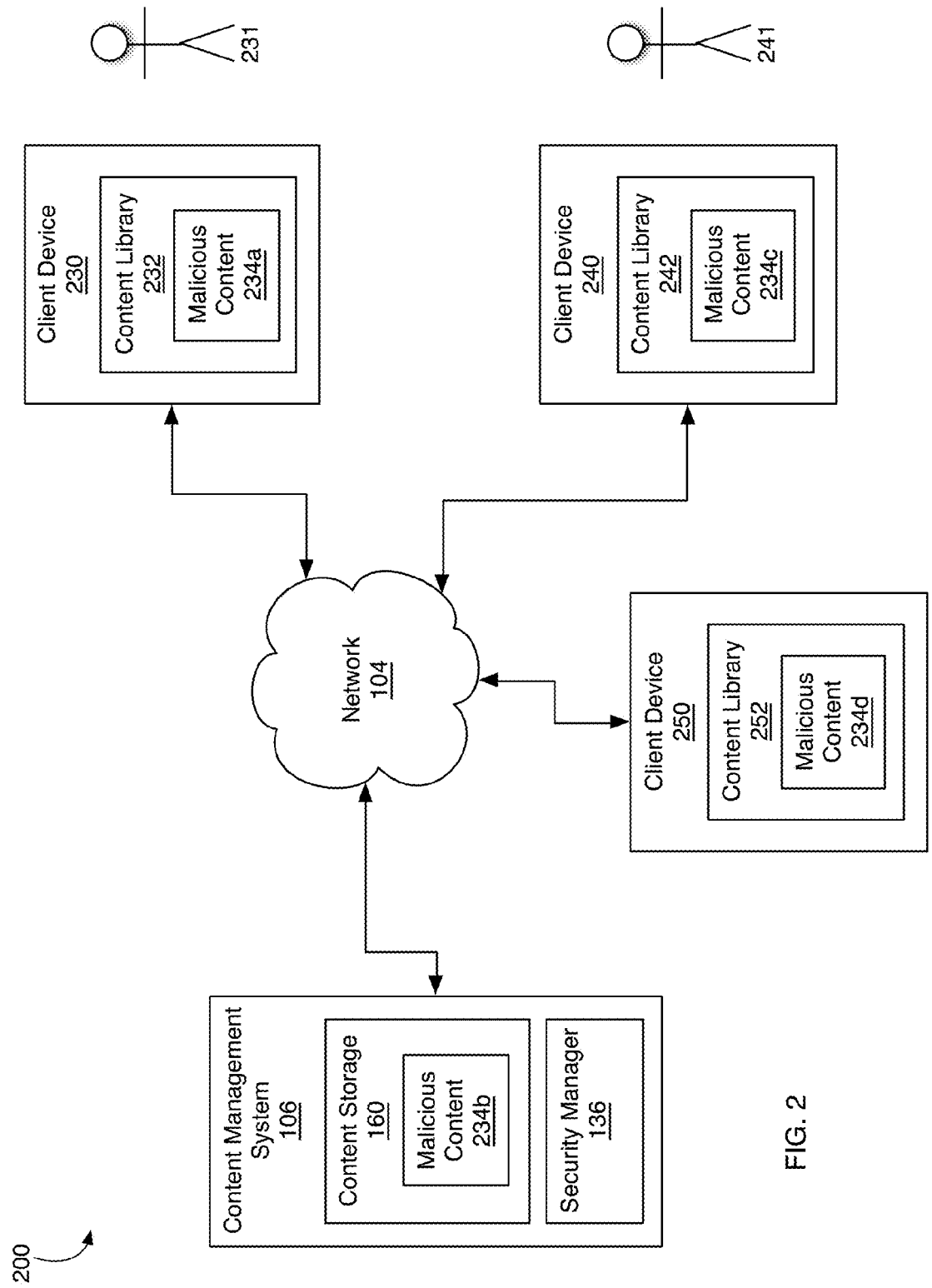
FIG. 2 illustrates an example system for scanning content items based on user activity.

FIG. 2 illustrates an example system 200 for scanning content items based on user activity. For example, system 200 can correspond to system 100 of FIG. 1. System 200 can include content management system 106 for managing content items uploaded from client devices corresponding to registered users. For example, content management system 106 can synchronize content items across multiple user client devices such that the content items stored on each user device are consistent across user devices.

In some embodiments, content management system 106 can include content storage 160 for storing content items associated with user accounts. For example, user 231 can use client device 230 (e.g., corresponding to one of client devices 102) to register with content management system 106 through network 104 to create a user account with content management system 106. Content management system 106 can collect information associated with the account of user 231, such as a username, a password, an IP address of client device 230, and an email address for the user. Once user 231 has created an account with content management system 106, user 231 can place content items stored on client device 230 into content library 232 (e.g., a folder, album, other collection or organization mechanism) to have the content items uploaded and stored in content storage 160 on content server 210. For example, content items stored in content library 232 can be automatically uploaded to content storage 160 through network 104 when user 231 places the content items in content library 232. Content items uploaded to and stored in content storage 160 from client device 230 can be associated with a user account corresponding to user 231.

In some embodiments, content management system 106 can synchronize content items stored in content storage 160 with multiple client devices. For example, user 241 can register client device 240 and client device 250 (e.g., corresponding to two of client devices 102) with content management system 106 to enable content managing for each device on content server 210. When user 241 of client device 240 moves a content item into content library 242, the content item can be automatically uploaded to content storage 160 on content server 210. Content management system 106 can, in turn, send the content item uploaded from client device 240 to client device 250 for storage in content library 252. Thus, content management system 106 can synchronize content libraries 242 and 252 of devices 240 and 250 so that user 241 can access the same content items on each client device 240 and 250.

In some embodiments, a user can share content items in content storage 160 with other users (e.g., other user accounts) of content management system 106. For example, content management system 106 can allow user 231 to specify content items to share with user 241. User 231 can specify user 241 by username, account identifier or email address, for example. When user 231 shares a content item in the content managing account of user 231 with user 241, the content item can be moved into the content managing account of user 241 on content management system 106. For example, the content item can be copied into or made available to (e.g., by link or by reference) the account of user 241 such that the shared content item is synchronized with client device 240 of user 241. For example, user 231 of client device 230 can share a content item in content library 232 with user 231 of client device 240. User 231 of client device 230 can share the content item by sending a reference (e.g., link, hyperlink, etc.) to the content item in an email to user 241. User 231 of client device 230 can share the content item by changing permissions or settings of the content item so that the content item is shared with or made available to user 241 of client device 240. User 241, through client device 240, can receive a notification that the content item is being shared with user 241 of client device 240. User 241 can choose to accept the shared content item by selecting a graphical element presented in the notification, for example. Once user 241 accepts the shared content item or selects the link in the email, the content item can be added to the content managing account of user 241 and synchronized with content libraries 242 and 252 on client devices 240 and 250.

Preventing Distribution of Malicious Content

In some embodiments, content management system 106 can be configured with security manager 136 for preventing the spread of malware through content management system 106. For example, user 231 can be a malicious user. User 231 can store malicious content item 234a in content library 232 on client device 230. Once malicious content item 234a is stored in content library 232, malicious content item 234a can be uploaded to content management system 106 and stored in content storage 160 (e.g., as malicious content item 234b) the same as any other content item, as described above. After malicious user 231 adds malicious content item 234a to content library 232 and after client device 230 synchronizes malicious content item 234a with content storage 160 (e.g., as malicious content item 234b), malicious user 231 can share malicious content item 234a with user 241. User 241 can accept shared malicious content item 234a, as described above, to cause malicious content item 234b to be synchronized with client devices 240 and 250. Content management system 106 can download malicious content item 234b to client device 240, which can store the content item as malicious content item 234c, and to client device 250, which can store the content item as malicious content item 234d. When user 241 downloads and/or views malicious content items 234c and/or 234d on client devices 240 and/or 250, client devices 240 and/or 250 can be infected with a software virus or other malware that can damage the client devices or steal and transmit sensitive data to user 231. To prevent the spread of malicious content, security manager 136 can be configured to identify malicious content in response to detecting malicious activity and prevent the identified malicious content from being shared or accessed by users of content management system 106.

In some embodiments, security manager 136 can monitor user (e.g., account holder) suspicious activity associated with content items hosted by content management system 106. For example, content storage 160 can store so many content items that it would be impractical for security manager 136 to scan each content item for malicious content (e.g., viruses, malware, etc.). Thus, in some embodiments, security manager 136 can select particular content items or particular user accounts to scan by monitoring the frequency of content item shares, downloads, and/or previews and selecting content items or user accounts to scan based on the frequency of content item shares, downloads, and/or previews.

Content Scan Policies

Figure 3:
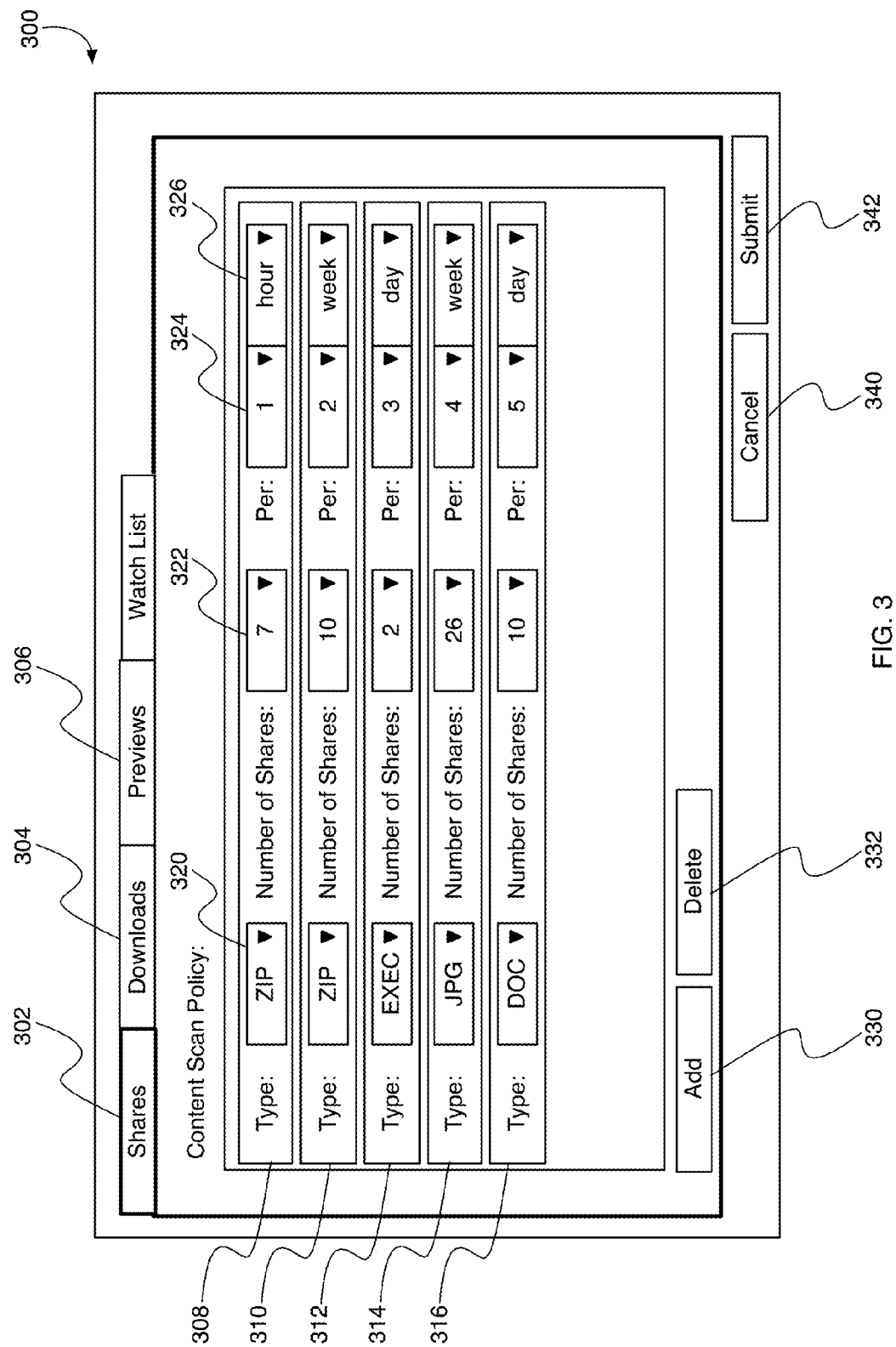
FIG. 3 illustrates an example graphical user interface for specifying policies for triggering a scan of a content item or user account.

FIG. 3 illustrates an example graphical user interface (GUI) 300 for specifying policies for triggering a scan of a content item or user account. For example, an administrator of content management system 106 and/or security manager 136 can provide input to GUI 300 to specify content item activity (e.g., share, download, preview, etc.) frequencies that will trigger a scan (e.g., virus scan) of a content item or user account. GUI 300 can be a graphical user interface of security manager 136, for example.

In some embodiments, GUI 300 can include graphical elements 302, 304, and/or 306 for selecting content item activities for which to specify content scanning policies. For example, graphical elements 302, 304 and/or 306 can be tabs corresponding to content item share policies (202), content item download policies (204), and content preview policies (206). A user can select a tab to view and/or specify policies corresponding to the tab category (e.g., share, download, preview, etc.).

In some embodiments, security manager 136 can use the policies specified by the administrator on the content share policies tab 302 to determine when content sharing by a user will trigger a scan (e.g., virus scan, malware scan) of the shared content. For example, when content shares policy tab 302 is selected, GUI 300 can present various user interface elements for allowing an administrator user to specify policies for when sharing a content item will trigger a content scan or an account scan.

In some embodiments, GUI 300 can include policy elements 308-316. For example, each policy element 308-316 can include features that allow an administrator to specify a content item type and an allowable share frequency for the content item type. Once a user (e.g., account holder) shares a particular content item a number of times that exceeds the allowable share frequency for the content item type, security manager 136 will initiate a scan of the shared content item. The following description will describe policy element 308, but the description of 308 applies similarly to policy elements 310-316.

In some embodiments, policy element 308 can include graphical element 320 for specifying a content item type. For example, the administrator can select graphical element 320 to cause a pull-down menu or other options menu, list, etc., to be displayed that presents content item types (e.g., file types) to which the policy corresponding to policy element 308 applies. Content item types can be, for example, compressed content items (e.g., zip files), executable content items (e.g., applications), image content items (e.g., jpg, tif, png, gif, etc.), or productivity documents (e.g., doc, xls, pages, etc.). As shown in FIG. 3, policy element 308 specifies a policy for well-known compressed type (e.g., zip file) content items.

In some embodiments, policy element 308 can include graphical elements 322, 324 and 326 for specifying a frequency. For example, graphical element 322 is a selectable graphical element for specifying a number (e.g., 7) of shares. Graphical elements 324 and 326 are selectable graphical element for specifying a time period. The combination of graphical elements 322, 324 and 326 specify a frequency (e.g., 7 shares per 1 hour). For example, an administrator user can manipulate graphical element 324 to specify a number (e.g., 1) by providing user input to GUI 300. The administrator can manipulate graphical element 326 to specify a unit of time (e.g., day, week, month, etc.) by providing user input to GUI 300. The combination of the number specified by graphical element 324 and the unit of time specified by graphical element 326 specify a time period. The combination of the number of shares (222) and the time period (224, 326) specifies a frequency of shares. Thus, the user-administrator can specify how many shares of a particular content item having a content item type over a specified time period will trigger a scan of the particular content item. If a content item of the specified type is shared more than the specified number of times within the specified time period (e.g., more than 7 times in one hour), then the content item will be scanned for malicious content (e.g., viruses, malware, etc.).

In some embodiments, GUI 300 can include graphical element 330 for adding policies to share policy tab 302. For example, if share policy tab 302 only includes policy element 308, the administrator can select graphical element 330 to add policy element 310. Thus, the administrator can specify many different policies for the same content item type and/or many different policies for different content item types.

In some embodiments, GUI 300 can include graphical element 332 for deleting policies from share policy tab 302. For example, if the administrator decides that a particular policy is not effective for detecting malicious content items, the administrator can select the policy element (e.g., policy element 316) corresponding to the ineffective policy and select graphical element 332 to delete the selected policy.

In some embodiments, security manager 136 can use the policies specified by the administrator on the content download policies tab 304 to determine when a content item download by a user's client device will trigger a scan of the downloaded content. For example, a user can download a content item to the user's client device when another user shares the content item with the user, e.g., through a share link. In some embodiments, like the content item share policies described above, the content download policies specified on download policies tab can specify how many downloads of a content item of a particular content type in a specified period of time will trigger a scan of the downloaded content item. The download policies on the download policies tab can be specified in the same manner using similar graphical elements as described above for content shares policies tab 302.

In some embodiments, security manager 136 can use the policies specified by the administrator on the content preview policies tab 304 to determine when a content preview on a user device will trigger a scan of the previewed content. For example, a user can preview a content item on the user's client device when another user shares the content item with the user. The preview can include a presentation of a representation of an image, song, document, or other item on the user's device. The preview can be performed before downloading the content item to the user's device, for example. Detecting a preview of a content item may provide an indication of an imminent download and give an opportunity to detect (e.g., scan for) malware before the user actually downloads the content item.

In some embodiments, like the content item share policies described above, the content preview policies specified on preview policies tab can specify how many previews of a content item of a particular content type in a specified period of time will trigger a scan of the previewed content item. The number of previews can be counted based on the number of unique users that have previewed the content item. For example, multiple previews of the content item by a single user will count as one preview. The number of previews can be counted based on all previews. For example, if a single user previews a content item five times, then five previews will be counted. The preview policies on the preview policies tab can be specified in the same manner using similar graphical user interface elements as described above for content shares policies tab 302, described above.

In some embodiments, when an administrator is done specifying scan policies using GUI 300, the administrator can select graphical element 342 to submit the specified policies to security manager 136. Once submitted, security manager 136 can use the security policies to determine when to scan content items for malicious content. For example, security manager 136 can monitor activity (e.g., shares, downloads, previews) associated with a particular content item, compare the activity to the policies for the type of the particular content item, and trigger a scan of the particular content item when the activity exceeds the activity frequencies for the content type specified by the scan policies. For example, security manager 136 can identify an activity as a suspicious activity when the activity exceeds one of the activity frequencies specified by the policies. Alternatively, the administrator can choose to close GUI 300 without submitting the policy changes to security manager 136 by selecting graphical element 340.

In some embodiments, when security manager 136 detects activity associated with a particular content item that triggers a scan of the particular content item, security manager 136 can scan all of the content items associated with the user account from which the particular content item originates. For example, if user 231 (FIG. 2) shares a content item with user 241, user 231 can be considered the originator of the content item. Thus, when user 231 shares the content item more than the number of times per time period (e.g., 8 times in 3 days) specified by a sharing policy, security manager 136 can scan not only the shared content item but also all content items associated with the account of user 231.

Likewise, when user 241 downloads the content item shared by user 231 and the download causes the number of downloads within a specified period of time to exceed a download policy defined threshold for downloads, then security manager 136 can scan not only the shared content item but also all content items associated with the account of user 231 since the downloaded content item originated with (e.g., was shared by) user 231.

Similarly, when user 241 previews the content item shared by user 231 and the preview causes the number of previews within a specified period of time to exceed a preview policy defined threshold for previews, then security manager 136 can scan not only the shared content item but also all content items associated with the content management system account of user 231 since the previewed content item originated with (e.g., was shared by) user 231.

Identifying High-Risk Users and Content Items

Figure 4:
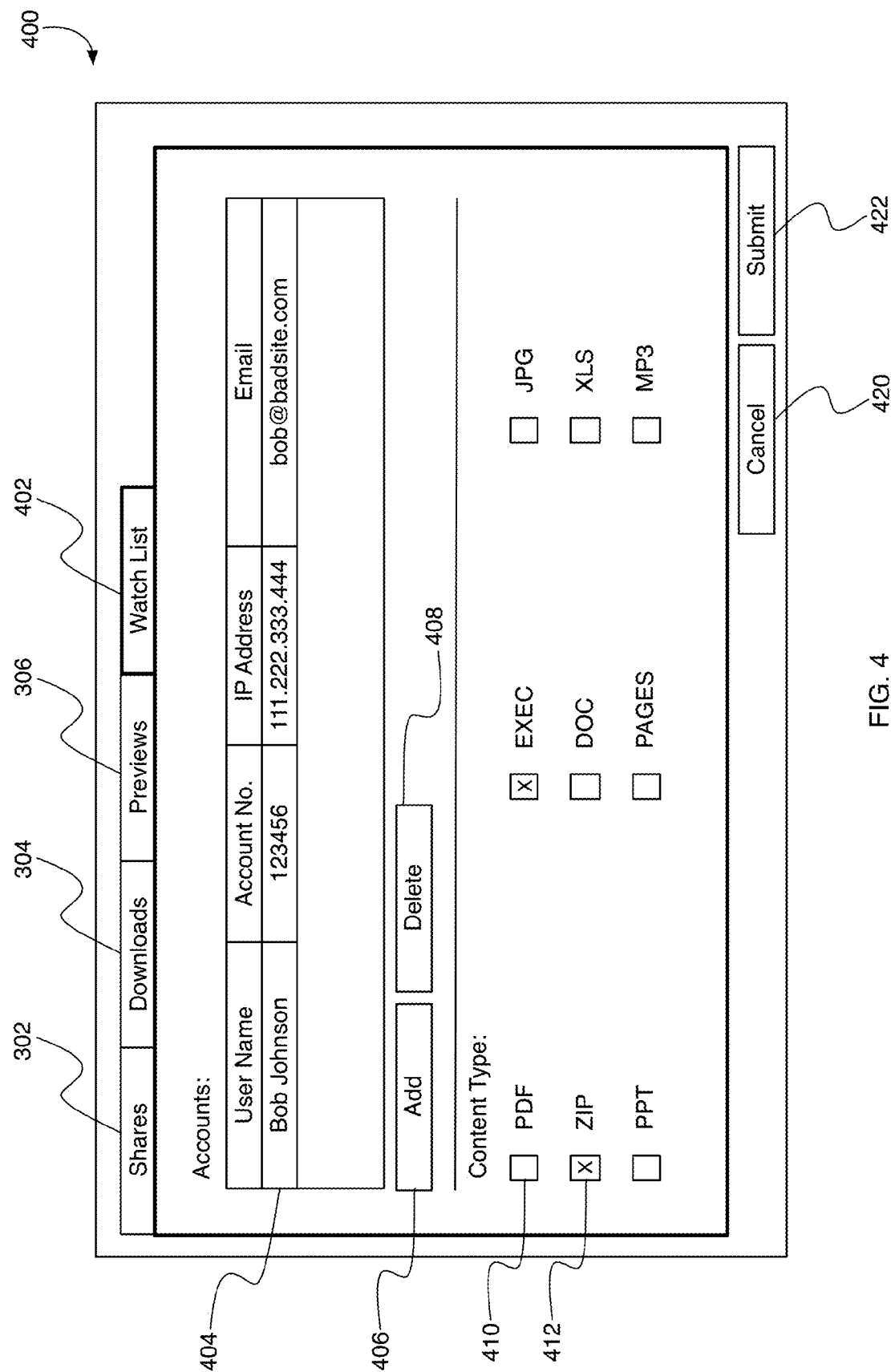
FIG. 4 illustrates an example graphical user interface for identifying high-risk users and/or high-risk content types.

FIG. 4 illustrates an example graphical user interface 400 for identifying high-risk users and/or high-risk content types. For example, GUI 400 can include graphical element 402 which, when selected by a user administrator, causes high-risk user accounts and/or high-risk content item types to be displayed on GUI 400. Graphical element 402 can be a graphical tab presented on GUI 400, for example.

Identifying High-Risk Users

In some embodiments, security manager 136 can identify a user of content management system 106 as a high-risk user. For example, security manager 136 can identify a user as a high-risk user when the user has been identified as an originator of malicious content. Security manager 136 can identify a user as a high-risk user when the user (e.g., user's device) has uploaded a large number of content items to content storage 160 during a short period of time. For example, security manager 136 can be configured with an upload frequency threshold (e.g., number of uploads per time period) which, when exceeded by a user or user device, causes security manager 136 to identify the user as a high-risk user. Security manager 136 can identify a user as a high-risk user when an IP address associated with the user's account is used to log in and create a large number (e.g., greater than a configured number) of accounts.

In some embodiments, when security manager 136 identifies a user as a high-risk user, security manager 136 can automatically add the high-risk user to a user account watch list. For example, security manager 136 can add the high-risk user's account to user account watch list 404 displayed on GUI 400. In some embodiments, the information identifying the high-risk user's account can be displayed in user watch list 404. For example, the account information can include the user's username, the user's account number, the IP address associated with the account, and an email address for the account, among other things.

In some embodiments, an administrator user can select graphical element 406 to add a user account to user account watch list 404. For example, the administrator may notice some suspicious activity corresponding to a user account and add the user account to watch list 404 by selecting graphical element 406 (e.g., a button) and inputting or selecting account information identifying the suspicious account (e.g., on a separate graphical interface not shown).

Identifying High-Risk Content Types

In some embodiments, security manager 136 can identify high-risk content item types on GUI 400. For example, security manager 136 can identify high-risk content types based on previously identified malicious content. For example, if a compressed content type (e.g., zip file) has been recently identified by security manager 136 as a source of malicious content, then security manager 136 can automatically identify compressed content types as a high-risk content type. Security manager 136 can automatically select graphical element 412 (e.g., check box) and GUI 400 can display selected graphical element 412 to identify that compressed content types are currently identified as high-risk content types. In contrast, if security manager 136 has not identified a content type (e.g., PDF) as high-risk, GUI 400 can display unselected graphical element 410 to indicate that the content type is not currently considered high-risk.

In some embodiments, security manager 136 can automatically identify high-risk content item types based on a detected trend. For example, rather than identifying a high-risk content item type based on one instance of malicious content, security manager 136 can identify a high-risk content type when security manager 136 has identified several instances (e.g., a configured number) of malicious content associated with the same content type within a (e.g., configured) period of time. For example, if security manager 136 detects five instances of malicious content corresponding to PDF content items within a one-hour period of time, then security manager 136 can identify a malicious content trend associated with PDF content items and identify the PDF content type as a high-risk content type.

In some embodiments, an administrator user can select high-risk content types on GUI 400. For example, if the administrator obtains information (e.g., from an external security source, the Internet, etc.) that identifies a current malicious content risk associated with a particular content type, then the administrator can identify the particular content type as a high-risk content type using GUI 400. The administrator can select the check box associated with the high-risk content type presented on GUI 400, for example. When the administrator determines that the risk associated with a particular content type has passed, the administrator can identify the particular content type as no longer being high-risk by deselecting (e.g., unchecking the check box) the particular content type presented on GUI 400.

In some embodiments, when the administrator is finished selecting high-risk users and/or high-risk content types, the administrator can select graphical element 422 to submit the selections to security manager 136. Alternatively, the administrator can select graphical element 420 to close GUI 400 without submitting any high-risk user and/or high-risk content item selections to security manager 136.

Adjusting Policies for High-Risk Users and Content Types

In some embodiments, security manager 136 can automatically adjust the configured content scan policies for high-risk users and/or high-risk content types. For example, security manager 136 can identify content items associated with a high-risk user and automatically lower (e.g., by a configured amount, percentage, etc.) the frequencies specified in the scan policies when determining whether to scan a content item associated with the high-risk user. For example, security manager 136 can be configured to allow a high-risk user 30% fewer content item shares, downloads, and/or previews within the policy-specified period of time. Similarly, when a particular content item type is identified as a high-risk content item type, then security manager 136 can automatically lower (e.g., by a configured amount, percentage, etc.) the frequencies specified in the scan policies for the high-risk content type. For example, security manager 136 can be configured to allow a high-risk content type 30% fewer content item shares, downloads, and/or previews within the policy-specified period of time.

Scanning Content Items

In some embodiments, when security manager 136 detects an activity (e.g., share, download, preview, etc.) associated with a particular content item that triggers a content item scan, security manager 136 can initiate an antivirus and/or anti-malware scan of the particular content item. For example, security manager 136 can invoke a third party antivirus and/or anti-malware software application to scan the content item for software viruses or other malware. When the antivirus or anti-malware application detects malicious content in a content item, security manager 136 can quarantine, block or delete the malicious content item.

In some embodiments, when security manager 136 detects an activity (e.g., share, download, preview, etc.) associated with a particular content item that triggers a content item scan, security manager 136 can initiate an antivirus and/or anti-malware scan of a user's account. For example, security manager 136 can determine a user account (e.g., originating user account) associated with the content item that triggered the scan. Security manager 136 can invoke a third party antivirus and/or anti-malware software application to scan each content item associated with a user's account for software viruses or other malware. When the antivirus/anti-malware application detects malicious content in a content item, security manager 136 can quarantine, block or delete the malicious content item.

Finding Duplicate Malicious Content Items

In some embodiments, security manager 136 can search for duplicate copies of the identified malicious content item. For example, security manger 136 can generate a hash value based on the content of the malicious content item. Security manager 136 can compare the hash value to hash values generated for other content items stored in content storage 160. If security manager 136 determines that the hash value for the malicious content item matches the hash value for another content item in content storage 160, security manager 136 can quarantine, block or delete the matching content item.

In some embodiments, security manager 136 can compare portions of an identified malicious content item to portions of other content items when searching for similar malicious content items. For example, security manager 136 can generate hash values for portions of the identified malicious content item. Security manager 136 can generate hash values for portions of other content items stored in content storage 160. Security manager 136 can compare the hash values generated for the identified malicious content item to the hash values generated for the other content items. If security manager 136 determines that more than a threshold percentage (e.g., a configured value, 65%) of the malicious content item hash values match the hash values generated for another content item, then security manager 136 can determine that the other content item is also a malicious content item. If security manager 136 determines that the other content item is a malicious content item, security manager 136 can quarantine, block or delete the other malicious content item.

Example Process

Figure 5:
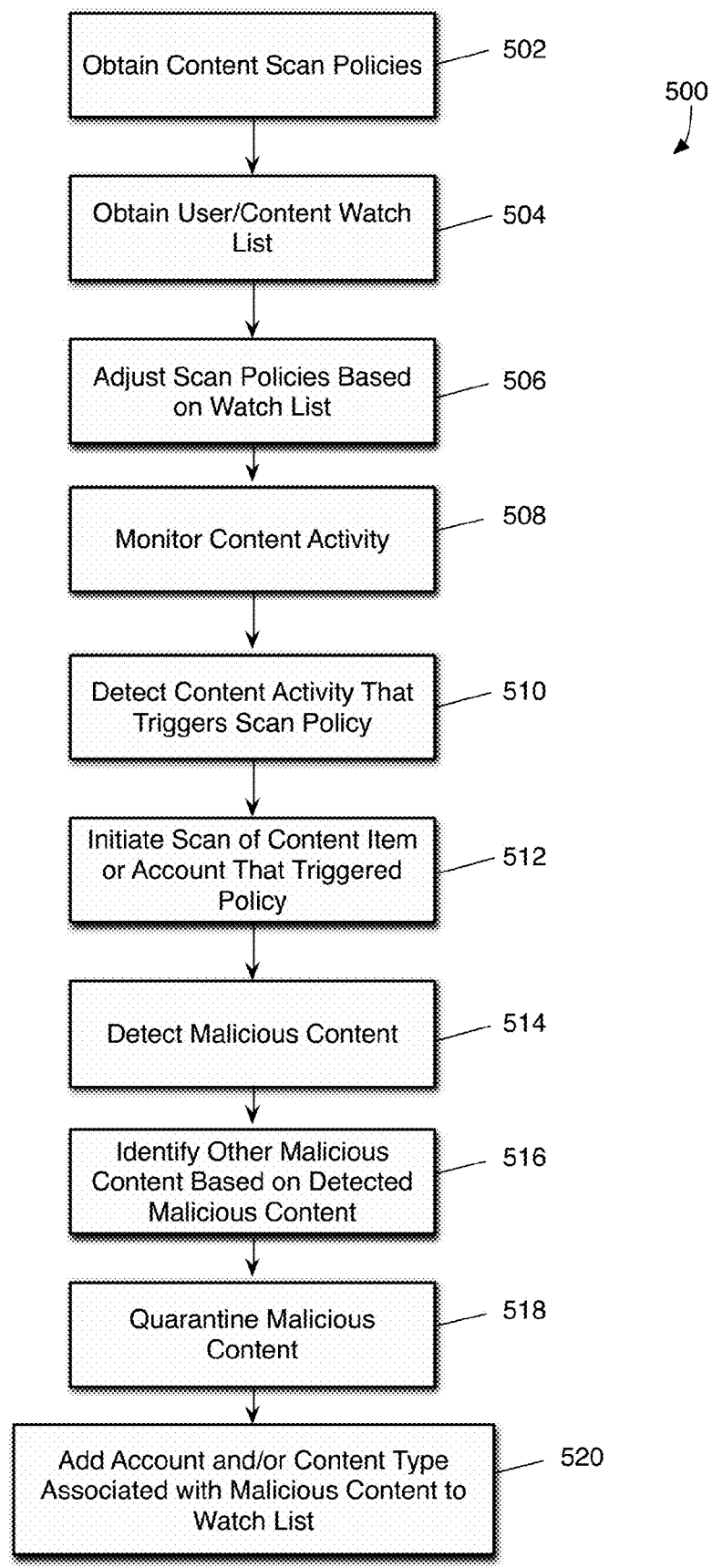
FIG. 5 is a flow diagram of an example process for scanning content items based on user activity.

FIG. 5 is a flow diagram of an example process 500 for scanning content items based on user activity. At step 502, security manager 136 can obtain content scan policies. For example, security manager 136 can obtain content scan policies from an administrator user through a graphical user interface, such as GUI 300 of FIG. 3. Security manager 136 can obtain content scan policies from non-volatile memory or a mass storage device (e.g., hard drive) associated with content management system 106, for example. The content scan policies can specify how often a user can share, download or preview a particular content item before triggering a content scan, as described above with reference to FIG. 3, for example.

At step 504, security manager 136 can obtain user and/or content type watch list information. For example, security manager 136 can obtain the user and/or content type watch list from an administrator user through a graphical user interface, such as GUI 300 of FIG. 3. The security manager can obtain the user and/or content type watch list from non-volatile memory or a mass storage device (e.g., hard drive), for example. The user and/or content type watch list information can specify high-risk users and/or high-risk content types, as described above with reference to FIG. 4, for example.

At step 506, security manager 136 can adjust the scan policies based on the user and/or content type watch list. For example, security manager 136 can adjust the policies for content items associated with a high-risk user to reduce the number of content items that a user can share, download to other users and/or preview to other users during a specified period of time, as described above with reference to FIG. 4.

At step 508, security manager 136 can monitor content activity. For example, security manager 136 can monitor how frequently each content item hosted by content management system 106 is shared, downloaded and/or previewed.

At step 510, security manager 136 can detect content activity that triggers a scan policy. For example, security manager 136 can compare the frequency of shares, downloads and/or previews of a content item to the content scan policies (or risk-adjusted policies) to determine when an activity (e.g., share, download, preview) should trigger a scan of the content item.

At step 512, security manager 136 can initiate a scan of a content item or user account that triggered a scan policy. For example, when security manager 136 detects a content activity associated with a content item that triggers a scan policy, security manager 136 can invoke an antivirus or anti-malware scan of the content item. In some embodiments, in addition to scanning the content item, security manager 136 can initiate a scan of content items associated with a user's account. For example, the content item that triggered the scan policy can be associated with an originating user (e.g., a user who uploaded or shared the content item). When a content scanning policy is triggered, security manager 136 can scan all of the content items associated with the originating user's account.

At step 514, security manager 136 can detect malicious content. For example, the antivirus and/or anti-malware software that scans the content item and/or user account can provide security manager 136 with information that identifies the scanned content item as malicious content or benign (e.g., safe) content.

At step 516, security manager 136 can identify other malicious content based on the malicious content detected at step 514. For example, when security manager 136 detects malicious content, security manager 136 can search content storage 160 for other copies of the detected malicious content. Security manager 136 can generate hash values based on the detected malicious content item and compare the hash values to hash values for other content items in content storage 160, for example. If the malicious content hash values (or a portion of the malicious content hash values) match the hash values generated for another content item in content storage 160, security manager 136 can determine that the other content item is also a malicious content item.

At step 518, security manager 136 can quarantine the identified malicious content. For example, security manager 136 can delete the identified malicious content item. Security manager 136 can block distribution of or access to the identified malicious content item. Security manager 136 can cause the identified malicious content item to be removed from client devices. For example, security manager 136 can cause the identified malicious content item to be removed from client devices 230, 240 and 250.

At step 520, security manager 136 can add the user account and/or content type associated with the malicious content to the watch list. For example, security manager 136 can add the user account associated with the malicious content to the high-risk user watch list. Security manager 136 can add the content type of the malicious content item to the high-risk content type watch list. Security manager 136 can determine a content type trend for detected malicious content and add the trending content type to the high-risk content type watch list. Security manager 136 can update the watch list so that security manager 136 can adjust its content scan policies in real-time based on developing threats to content management system 106 and its users.

Example System Architecture

Figure 6A:
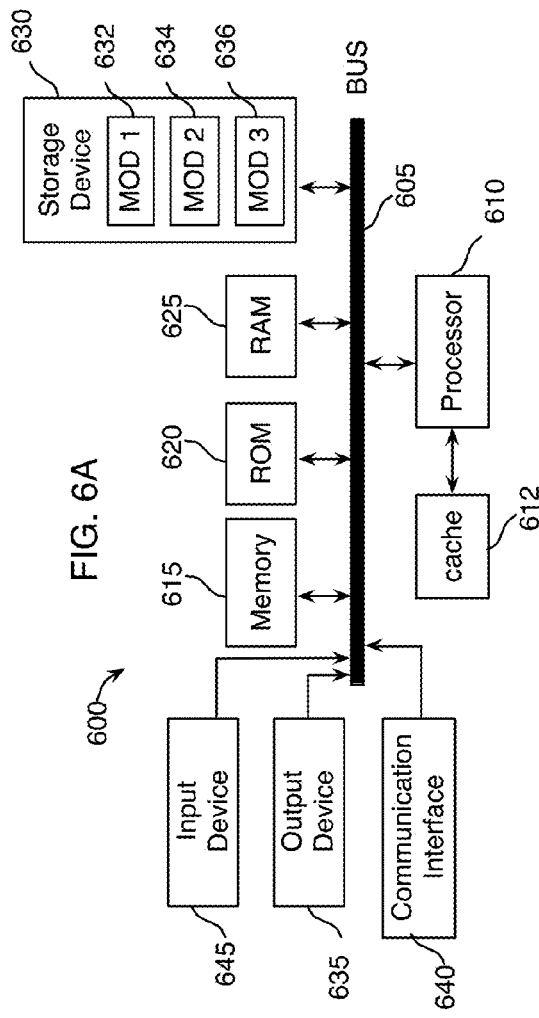
FIG. 6A and FIG. 6B illustrate example system embodiments for implementing the systems and processes of FIGS. 1-5.
Figure 6B:
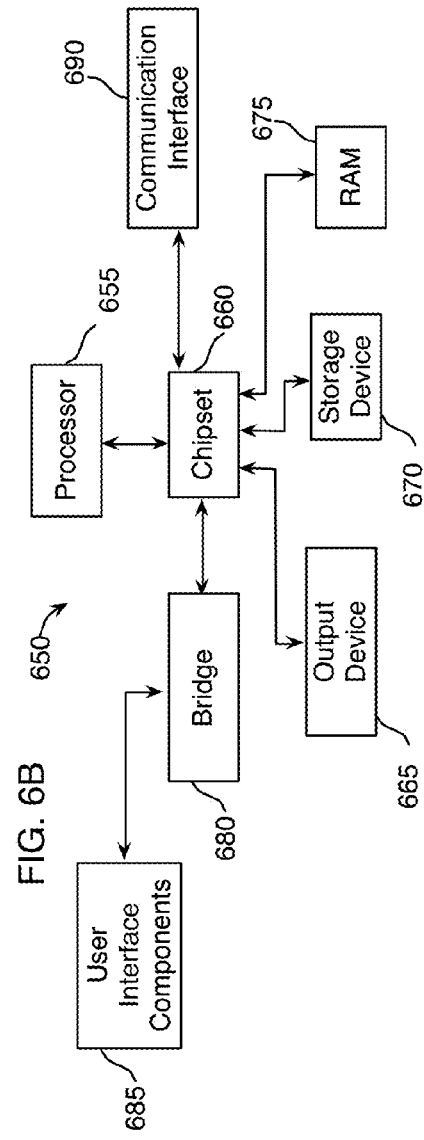

FIG. 6A and FIG. 6B show example system embodiments for implementing the systems and processes of FIGS. 1-5. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Example system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of embodiments. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   obtaining, by a computing device, one or more scan policies for initiating a scan for malicious content within a particular content item, wherein the particular content item and other content items are stored on the content management system, wherein each of the scan policies is associated with a content item activity; and
   scanning only the particular content item already stored on the content management system for malicious content when a detected activity associated with the particular content item triggers one of the scan policies, wherein the detected activity is at least one of sharing the particular content item, downloading the particular content item, or previewing the particular content item.

2. The method of claim 1, wherein the one or more scan policies specify an allowable frequency for a specified content item activity.

3. The method of claim 1, wherein the one or more scan policies specify a content item type.

4. The method of claim 1, wherein the scan policy is triggered when the detected activity exceeds a number of occurrences allowed for the detected activity as specified by the scan policy.

5. A non-transitory computer readable medium including one or more sequences of instructions which, when executed by one or more processors, causes:
   obtaining, by a computing device, one or more scan policies for initiating a scan for malicious content within a particular content item, wherein the particular content item and other content items are stored on the content management system, wherein each of the scan policies is associated with a content item activity;
   obtaining, by the computing device, high-risk user account information that identifies one or more high risk user accounts among user accounts of the content management system;

detecting an activity associated with the particular content item;

determining that the particular content item is associated with at least one of the high-risk user accounts; and adjusting the scan policies based on the determination that the content item is associated with a high risk account; and scanning only the particular content item already stored on the content management system for malicious content when the detected activity associated with the particular content item triggers one of the adjusted scan policies, wherein the detected activity includes previewing the particular content item.

6. The non-transitory computer readable medium of claim 5, wherein the one or more scan policies specify an allowable frequency for a specified content item activity.

7. The non-transitory computer readable medium of claim 6, wherein the instructions that cause adjusting the scan policies include instructions that reduce the allowable frequency for the specified content item activity.

8. The non-transitory computer readable medium of claim 5, wherein the scan policy is triggered when the detected activity exceeds a number of occurrences allowed for the detected activity as specified by the scan policy.

9. A system comprising:
one or more processors; and
a non-transitory computer readable medium including one or more sequences of instructions which, when executed by the one or more processors, causes:
obtaining, by a computing device, one or more scan policies for initiating a scan for malicious content within a particular content item, wherein the particular content item and other content items are stored on the content management system, wherein each of the scan policies is associated with a content item activity;

obtaining, by the computing device, high-risk content type information that identifies one or more high risk content types;

detecting an activity associated with the particular content item;

determining that the particular content item corresponds to at least one of the high-risk content types; and adjusting the scan policies based on the determination that the content item is a high-risk content type; and scanning only the particular content item already stored on the content management system for malicious content when the detected activity associated with the particular content item triggers one of the adjusted scan policies, wherein the detected activity includes previewing the particular content item.

10. The system of claim 9, wherein the one or more scan policies specify an allowable frequency for a specified content item activity.

11. The system of claim 10, wherein the instructions that cause adjusting the scan policies include instructions that reduce the allowable frequency for the specified content item activity associated with the high-risk content type.

12. The system of claim 9, wherein the scan policy is triggered when the detected activity exceeds a number of occurrences allowed for the detected activity as specified by the scan policy.

* * * * *